(12) United States Patent
Malladi et al.

(10) Patent No.: US 6,831,906 B2
(45) Date of Patent: Dec. 14, 2004

(54) METHOD AND APPARATUS FOR EFFICIENT USE OF COMMUNICATION RESOURCES IN A CDMA COMMUNICATION SYSTEM

(75) Inventors: Durga P. Malladi, San Diego, CA (US); Alkinoos Hector Vayanos, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 254 days.

(21) Appl. No.: 10/032,955

(22) Filed: Oct. 26, 2001

(65) Prior Publication Data

US 2003/0081586 A1 May 1, 2003

(51) Int. Cl.[7] .................................................. H04J 3/00
(52) U.S. Cl. ....................................... 370/336; 455/522
(58) Field of Search .......................... 370/336; 455/450, 455/453, 509, 515, 522; 379/268

(56) References Cited

FOREIGN PATENT DOCUMENTS

| WO | 0103332 | 1/2001 |
|---|---|---|
| WO | 0178269 | 10/2001 |

*Primary Examiner*—Alpus H. Hsu
*Assistant Examiner*—Justin M. Philpott
(74) *Attorney, Agent, or Firm*—Philip R. Wadsworth; Thien T. Nguyen; S. Hossain Beladi

(57) ABSTRACT

A method and apparatus provides for efficient use of communication resources in a CDMA communication system (100) by selecting, at a time prior to a first time period (401), a first mobile station to receive transmission during the first time period (401) on a downlink shared channel, and selecting, at a time prior to the first time period (401), a second mobile station to receive transmission during a second time period (402) on the downlink shared channel. Transmission power level of a downlink shared control channel is determined for transmission to the second mobile station during an overlapping time period (403) with the first time period (401), and the transmission power level of the downlink shared channel for transmission during the first time period (401) is determined based on at least the determined transmission power level of the downlink shared control channel during the overlapping time period (403).

20 Claims, 4 Drawing Sheets

METHOD AND APPARATUS FOR EFFICIENT USE OF COMMUNICATION RESOURCES IN A CDMA COMMUNICATION SYSTEM

BACKGROUND

1. Field

The present invention relates generally to the field of communications, and more particularly, to communications in a cellular communication system.

2. Background

In code division multiple access (CDMA) communication systems, unnecessary and excessive transmission by a mobile station user or base-station may cause interference for other mobile station users in addition to reducing the system capacity. The communication system may provide communication services that include wireless radio transmission of digitized speech, still or moving images, text messages and other types of data. An encoder in a transmitter of the communication system may receive a packet of data for encoding. Each data packet may be transmitted in a time frame. A receiving destination may report a channel condition such as carrier to interference (C/I) information to the transmitting source before transmission of the data packet. The C/I information may be used by the transmitting source to select and adjust the power level and/or data rate of transmission of the data packet. The C/I measurement may be made several time slots before the transmission time of the data packet. The channel condition, however, may change drastically over several time slots. As such, the selected power level and data rate may not be at an optimum level. Therefore, the selected data rate and the power level may be higher or lower than the optimum level for the channel condition at the transmission time.

To this end as well as others, there is a need for a method and apparatus for efficient use of communication resources in a communication system.

SUMMARY

A method and apparatus provides for efficient use of communication resources in a CDMA communication system by selecting, at a time prior to a first time period, a first mobile station to receive transmission during the first time period on a downlink shared channel, and selecting, at a time prior to the first time period, a second mobile station to receive transmission during a second time period on the downlink shared channel. Transmission power level of a downlink shared control channel is determined for transmission to the second mobile station during an overlapping time period with the first time period, and the transmission power level of the downlink shared channel for transmission during the first time period is determined based on at least the determined transmission power level of the downlink shared control channel during the overlapping time period with the first time period.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a system for wireless communications in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, and http://www.3gpp.org or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, a novel and improved method and apparatus provide for efficient use of communication resources in a CDMA communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
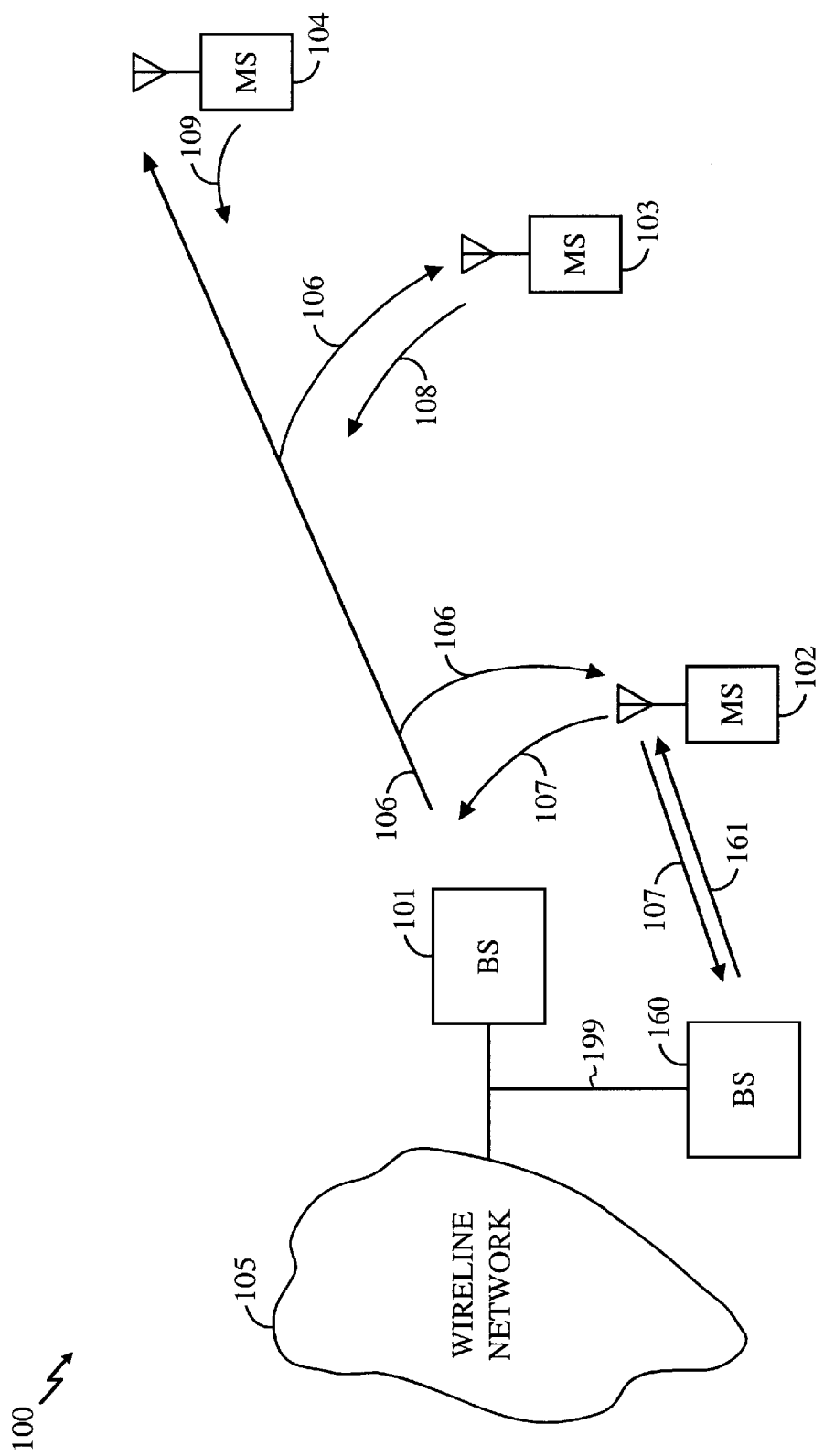
FIG. 1 illustrates a communication system 100 capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals or user equipment and the base station as data access network without departing from the main scope and various advantages of the invention. Base station 101 may include a number of components, such as a base station controller and a base transceiver system. For simplicity, such components are not shown. Base station 101 may also be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link (down link) signal transmitted from base station 101. The terms forward link and downlink are synonymous. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links (uplinks). The terms uplink and reverse link are synonymous. Each reverse link is maintained by a reverse link signal, such as reverse link signals 107–109 for respectively mobile stations 102–104.

In a soft handoff situation, base stations 101 and 160 may be communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a data packet to mobile station 102 in soft handoff, base stations 101 and 160 transmit identical information synchronously to the mobile station 102. On the reverse link, both base stations 101 and 160 may attempt to decode the traffic data transmission from the mobile station 102. The base stations 101 and 160 may also transmit a pilot channel on the forward link to assist the mobile stations in decoding various channels on the forward link.

Figure 2:
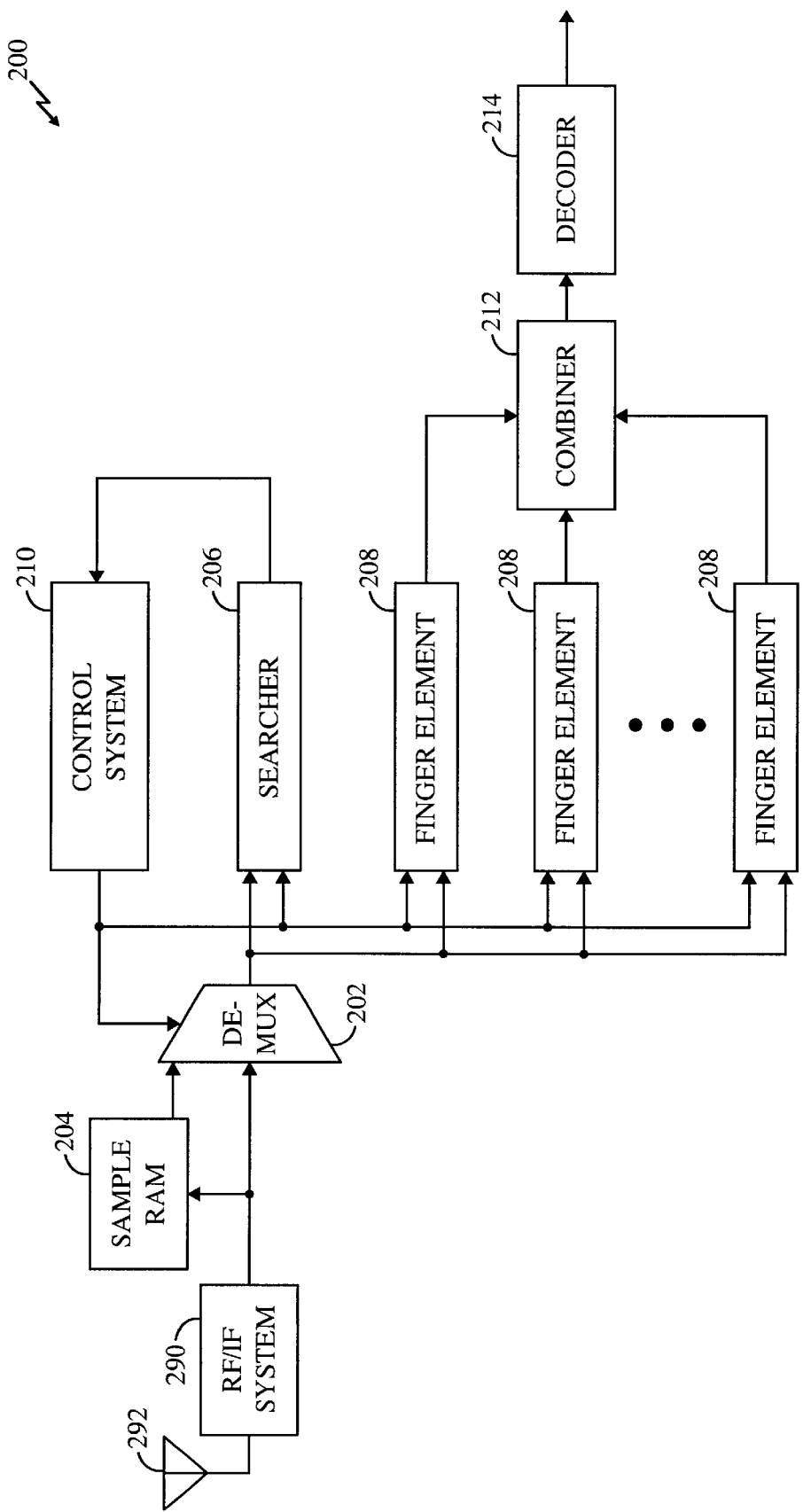
FIG. 2 illustrates a communication system receiver for receiving and decoding received data.

FIG. 2 illustrates a block diagram of a receiver 200 used for processing and demodulating the received CDMA signal. Receiver 200 may be used for decoding the information on reverse and forward links signals. Receive (Rx) samples may be stored in RAM 204. Receive samples are generated by a radio frequency/intermediate frequency (RF/IF) system 290 and an antenna system 292. Antenna system 292 receives an RF signal, and passes the RF signal to RF/IF system 290. RF/IF system 290 may be any conventional RF/IF receiver. The received RF signals are filtered, downconverted and digitized to form RX samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with soft-output Viterbi algorithm concatenated or a turbo decoder.

During operation, receive samples are supplied to demux 202. Demux 202 supplies the samples to searcher unit 206 and finger elements 208. Control unit 210 configures finger elements 208 to perform demodulation of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

Figure 3:
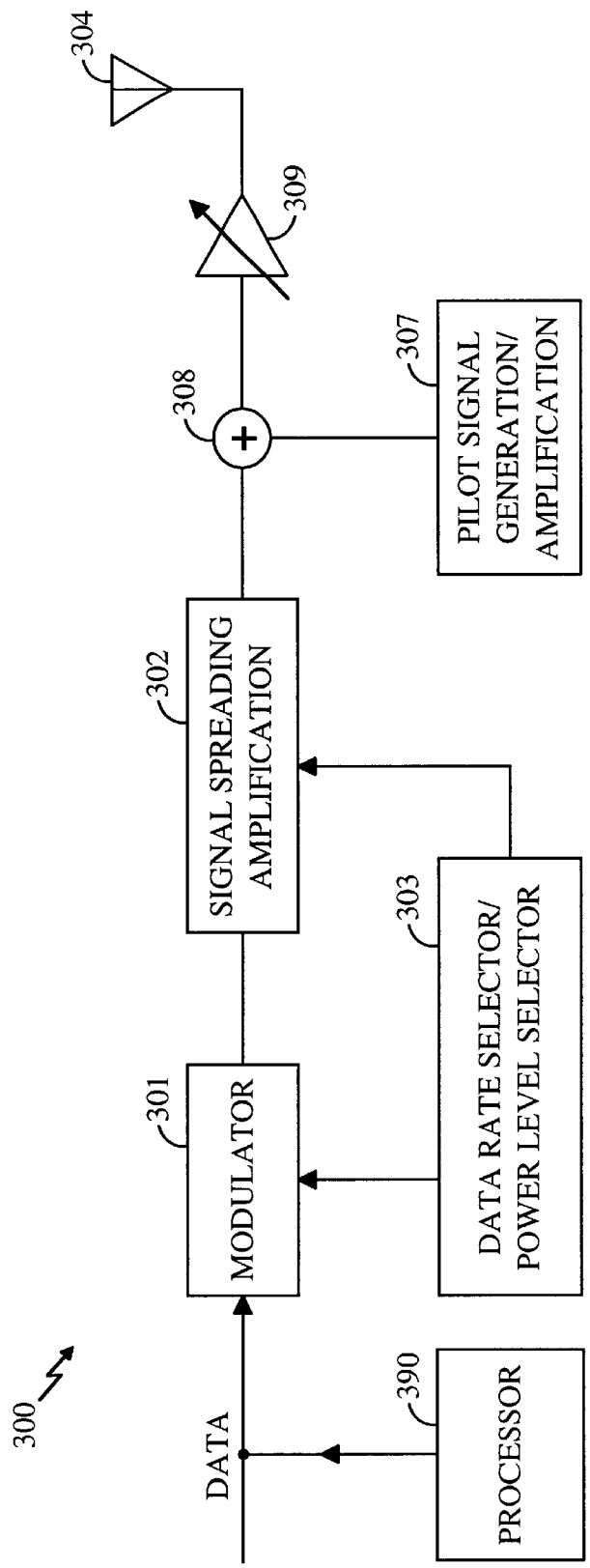
FIG. 3 illustrates a communication system transmitter for transmitting data over frames of data in accordance with various aspects of the invention.

FIG. 3 illustrates a block diagram of a transmitter 300 for incorporating various aspects of the invention. Data relating to a control channel or a traffic channel are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information from a receiving destination. The information may include a data rate request and report of a channel condition at the receiver. The data rate and power level selector 303 accordingly selects the data rate in modulator 301. The output of modulator 301 passes through a signal spreading operation and amplified in a block 302 for transmission from an antenna 304. A pilot signal is also generated in a block 307. The pilot signal is amplified to an appropriate level in block 307. The pilot signal power level may be in accordance with the channel condition at a receiving end. The pilot signal may be combined with the control or traffic channel signal in a combiner 308. The combined signal may be amplified in an amplifier 309 and transmitted from antenna 304. The data rate and power level selector 303 also selects a power level for the amplification level of the transmitted signal in accordance with the feedback information. The combination of the selected data rate and the power level allows proper decoding of the transmitted data at the receiving destination.

Figure 4:
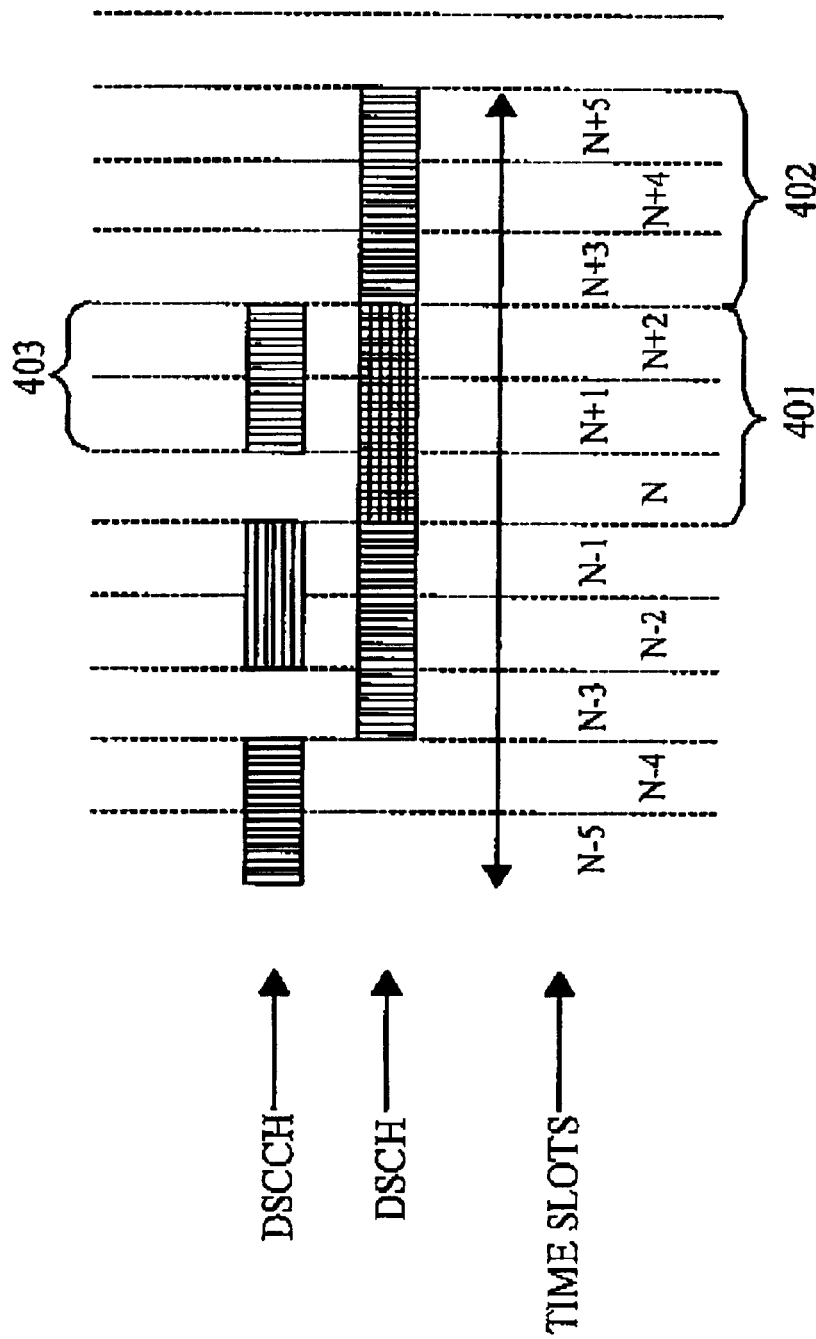
FIG. 4 illustrates transmission of packets of data to one or more mobile stations in accordance with various aspects of the invention.

Transmission to the mobile stations from the base station may be over several channels. Referring to FIG. 4, a time line for transmission of different channels to the mobile stations is shown. A channel may be shared among the mobile stations on the downlink transmission. The base station transmits to different mobile stations at different time slots on the shared channel. At about two time slots before the transmission on a downlink shared channel (DSCH), the base station may use two time slots to transmit control information on a downlink shared control channel (DSCCH) to a mobile station about various aspects of the DSCH transmission on the immediately subsequent time slots. The transmission on the DSCH may be over three time slots in accordance with an embodiment. For example, at time slots "n−2" and "n−1" on DSCCH, the base station transmits control information such as the modulation scheme and modulation order used for transmission on the DSCH to the same mobile station. On time slots "n through n+2", the base station transmits on the DSCH to the mobile station at the same modulation order and modulation scheme reported during the previous two time slots on the DSCCH. The mobile station decodes the DSCCH, and uses the decoded information for decoding the information on the DSCH. The modulation order and modulation scheme are decided based on the feed back information previously received from the same mobile station. The base station transmitter 300 through data rate and power selector 303 selects an appropriate modulation scheme and order for transmission during DSCH. The selection takes into account the available power and possible carrier-to-interference level at the mobile station in accordance with an embodiment of the invention.

A processor 390 in transmitter 300 employed by a base station schedules transmission of DSCH to various mobile stations in accordance with various embodiments of the invention. The processor 390 selects, at a time slot "n−3", where "n" is a time slot index, a first mobile station to receive transmission during time slots "n through n+2" on the DSCH. In accordance with an embodiment of the invention, the processor 390 also at about the same time selects a second mobile station to receive transmission during time slots "n+3 through n+5" on the DSCH. The data rate and power level selector 303 determines transmission power level of the DSCCH for transmission of the control information to the second mobile station during time slots "n+1 through n+2". The determined power level may be based on prior feed back information received from the second mobile station. The data rate and power level selector 303 in accordance with an embodiment of the invention determines the transmission power level of the DSCH during transmission on the time slots "n through n+2" to the first mobile station based on at least the determined transmission power level of the DSCCH to the second mobile station during the time slots "n+1 through n+2". Transmitter 300 transmits to the first mobile station on the DSCH during the time slots "n through n+2" at the determined transmission power level.

At a time slot "n", before transmission on the DSCCH to the second mobile station, the processor 390 evaluates a channel condition at the second mobile station to determine whether the second mobile station is still the best candidate for a subsequent transmission during said time slots "n+3 through n+5" on the DSCH. If the second mobile station is still the best candidate, the transmitter 300 transmits to the second mobile station on the DSCCH during time slots n+1 through n+2". If the second mobile station is not the best candidate, a new mobile station is selected. Processor 390 selects a third mobile station as the best candidate to receive transmission during the time slots "n+3 through n+5" on the DSCH. Transmitter 300 transmits to the third mobile station on the DSCCH during the time slots "n+1 through n+2" about the modulation scheme and modulation order selected for transmission to the third mobile station during time slots "n+3 through n+5" on the DSCH.

Generally stated, in a communication system 100, processor 390 in a base station 101 selects, at a time prior to a first time period 401, a first mobile station to receive transmission during the first time period 401, on the DSCH. At a time prior to the first time period 401, a second mobile station is also selected to receive transmission during a second time period 402, on DSCH. Data rate and power level selector 303 determines the transmission power level of the DSCCH for transmission to the second mobile station during an overlapping time period 403 with the first time period 401. The data rate and power level selector 303 in accordance with an embodiment of the invention determines the transmission power level of the DSCH for transmission during the first time period 401 based on at least the determined transmission power level of the DSCCH during the overlapping time period 403 with the first time period 401. Transmitter 300 transmits to the first mobile station on the DSCH during the first time period 401 at the determined transmission power level. Processor 390 evaluates, at a time prior to the first time period 401, a channel condition at the second mobile station to determine whether the second mobile station is a best candidate for a subsequent transmission during the second time period 402 on the DSCH. Processor 390 selects a third mobile station as the best candidate to receive transmission during the second time period 402 on the DSCH, if the channel condition is more favorable for the third mobile station to receive transmission on the DSCH during the second time period 402. The transmitter 300 transmits to the third mobile station on the DSCCH during the overlapping time period 403 with the first time period 401 to notify the third base station that the second time period 402 is selected for a transmission on DSCH to the third mobile station in accordance with a selected modulation scheme and modulation order.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:

selecting, at a time slot "n−3", where "n" is a time slot index, a first mobile station to receive transmission occurring during time slots "n through n+2" on a downlink shared channel;

selecting, at said time slot "n−3", a second mobile station to receive transmission occurring during time slots "n+3 through n+5" on said downlink shared channel;

determining transmission power level of a downlink shared control channel for transmission to said second mobile station, occurring during time slots "n+1 through n+2"; and determining transmission power level of said downlink shared channel for transmission occurring during said time slots "n through n+2" based on at least said determined power level of said downlink shared control channel for transmission occurring during said time slots "n+1 through n+2".

2. The method as recited in claim 1 further comprising:

transmitting to said first mobile station on said downlink shared channel during said time slots "n through n+2" at said determined transmission power level.

3. The method as recited in claim 1 further comprising:

evaluating, at a time slot "n", a channel condition at said second mobile station to determine whether said second mobile station is a best candidate for a subsequent transmission during said time slots "n+3 through n+5" on said downlink shared channel.

4. The method as recited in claim 3 further comprising:

selecting a third mobile station as the best candidate to receive transmission during said time slots "n+3 through n+5" on said downlink shared channel.

5. The method as recited in claim 4 further comprising:

transmitting to said third mobile station on said downlink shared control channel during said time slots "n+1 through n+2".

6. In a communication system, an apparatus comprising:

means for selecting, at a time slot "n−3", where "n" is a time slot index, a first mobile station to receive transmission occurring during time slots "n through n+2" on a downlink shared channel;

means for selecting, at said time slot "n−3", a second mobile station to receive transmission occurring during time slots "n+3 through n+5" on said downlink shared channel;

means for determining transmission power level of a downlink shared control channel for transmission, to said second mobile station, occurring during time slots "n+1 through n+2"; and means for determining transmission power level of said downlink shared channel for transmission occurring during said time slots "n through n+2" based on at least said determined power level of said downlink shared control channel for transmission occurring during said time slots "n+1 through n+2".

7. The apparatus as recited in claim 6 further comprising:

means for transmitting to said first mobile station on said dedicated shared channel during said time slots "n through n+2" at said determined transmission power level.

8. The apparatus as recited in claim 7 further comprising:

means for evaluating, at a time slot "n", a channel condition at said second mobile station to determine whether said second mobile station is a best candidate for a subsequent transmission during said time slots "n+3 through n+5" on said downlink shared channel.

9. The apparatus as recited in claim 8 further comprising:

means for selecting a third mobile station as the best candidate to receive transmission during said time slots "n+3 through n+5" on said downlink shared channel.

10. The apparatus as recited in claim 9 further comprising:

means for transmitting to said third mobile station on said downlink shared control channel during said time slots "n+1 through n+2".

11. In a communication system, a transmitter comprising:

a processor for selecting, at a time slot "n−3", where "n" is a time slot index, a first mobile station to receive transmission occurring during time slots "n through n+2" on a downlink shared channel, and selecting, at said time slot "n−3", a second mobile station to receive transmission occurring during time slots "n+3 through n+5" on said downlink shared channel; and a data rate and power level selector, communicatively coupled to said processor, for determining transmission power level of a downlink shared control channel for transmission, to said second mobile station, occurring during time slots "n+1 through n+2", and determining transmission power level of said downlink shared channel for transmission occurring during said time slots "n through n+2" based on at least said determined power level of said downlink shared control channel for transmission occurring during said time slots "n+1 through n+2".

12. The transmitter as recited in claim 11 further comprising:

a modulator, signal spreader and amplifier, communicatively coupled to said data rate and power selector, for transmitting to said first mobile station on said downlink shared channel during said time slots "n through n+2" at said determined transmission power level.

13. The transmitter as recited in claim 12 wherein said processor is configured for evaluating, at a time slot "n", a channel condition at said second mobile station to determine whether said second mobile station is a best candidate for a subsequent transmission during said time slots "n+3 through n+5" on said downlink shared channel.

14. The transmitter as recited in claim 13 wherein said processor is configured for selecting a third mobile station as the best candidate to receive transmission during said time slots "n+3 through n+5" on said downlink shared channel.

15. The transmitter as recited in claim 14 wherein said modulator, signal spreader and amplifier is configured for transmitting to said third mobile station on said downlink shared control channel during said time slots "n+1 through n+2".

16. In a communication system, a method comprising:

selecting, at a time prior to a first time period, a first mobile station to receive transmission occurring during said first time period, on a downlink shared channel;

selecting, at a time prior to said first time period, a second mobile station to receive transmission occurring a second time period, on said downlink shared channel;

determining transmission power level of a downlink shared control channel for transmission, to said second mobile station, occurring during an overlapping time period with said first time period; and determining transmission power level of said downlink shared channel for transmission occurring during said first time period based on at least said determined power level of said downlink shared control channel for transmission occurring during said overlapping time period with said first time period.

17. The method as recited in claim 16 further comprising:

transmitting to said first mobile station on said downlink shared channel during said first time period at said determined transmission power level.

18. The method as recited in claim 16 further comprising:

evaluating, at a time prior to or during said first time period, a channel condition at said second mobile station to determine whether said second mobile station is a best candidate for a subsequent transmission during said second time period on said downlink shared channel.

19. The method as recited in claim 18 further comprising:

selecting a third mobile station as the best candidate to receive transmission during said second time period on said downlink shared channel.

20. The method as recited in claim 19 further comprising:

transmitting to said third mobile station on said downlink shared control channel during said overlapping time period with said first time period.

\* \* \* \* \*